United States Patent [19]

Wilkinson

[11] Patent Number: 5,441,372
[45] Date of Patent: Aug. 15, 1995

[54] ROCK BOLT SHELL AND CONE

[75] Inventor: John C. Wilkinson, Norwich, Canada

[73] Assignee: Premetalco, Inc., Rexdale, Canada

[21] Appl. No.: 339,875

[22] Filed: Nov. 10, 1994

Related U.S. Application Data

[63] Continuation of Ser. No. 56,916, May 5, 1993, abandoned.

[51] Int. Cl.[6] .................. F16B 13/06; F16B 39/02; E21D 20/00
[52] U.S. Cl. ........................ 411/60; 411/51; 411/72; 411/82; 405/259.5
[58] Field of Search ............ 411/50, 51, 53, 57, 411/60, 61, 63–66, 71, 72, 82; 405/259.1, 259.2, 259.5, 259.6

[56] References Cited

U.S. PATENT DOCUMENTS

| | | |
|---|---|---|
| 3,695,045 | 10/1972 | Williams . |
| 3,837,258 | 9/1974 | Williams . |
| 3,908,386 | 9/1975 | Williams . |
| 4,764,055 | 8/1988 | Clark et al. ............ 405/259.6 X |
| 5,011,337 | 4/1991 | Clark et al. ............ 405/259.6 |
| 5,033,910 | 7/1991 | Wright ................. 405/259.5 X |
| 5,078,547 | 1/1992 | Calandra, Jr. et al. ...... 405/259.5 |
| 5,181,800 | 1/1993 | Stankus et al. ............ 411/82 X |

FOREIGN PATENT DOCUMENTS 1364234 8/1974 United Kingdom ............ 411/71

OTHER PUBLICATIONS

Williams Form Engineering Corp. Catalog No. 392 (1992) pp. 1–40.

Primary Examiner—Neill R. Wilson
Attorney, Agent, or Firm—Sherman and Shalloway

[57] ABSTRACT

A rock bolt shell and cone. An expansible shell having a cylindrical outer surface and raised ridges in relief on the exterior of the shell. One or more ridges are located along a curve non-congruent with a circumferential circle of the cylinder. In a disclosed embodiment, each ridge lies along a helix of the cylinder and ridges are paired such that the helix of a first extends in one rotational direction while the curve of a second of the pair extends in the other rotational direction. Each helix forms an angle of forty-five degrees with a center line of the cylinder. Ridges intersect such that "V"-shaped projections extend along the outside of the shell. The vertices of certain of the projections project a radially maximum amount while each of the legs of the "V" taper radially inwardly toward the cylindrical surface as the leg extends away from the vertex. The cone, threaded for installation on a bolt rod has one or more axial indentations to improve grout flow about an installed bolt.

47 Claims, 7 Drawing Sheets

ROCK BOLT SHELL AND CONE

This application is a continuation of application Ser. No. 08/056,916, filed May 5, 1993 now abandoned.

FIELD OF THE INVENTION

This invention relates to ground anchoring devices and the like. Particularly, this invention relates to a rock bolt having a cone threaded onto an end of a rod and an expansible shell surrounding the cone, the cone being for contact with the wall of an underground hole for securing the bolt therein.

BACKGROUND TO THE INVENTION

Rock bolts are used for ground stabilization, as in the mining industry or they can be used as ground anchoring devices as for anchoring heavy equipment to a ground surface. There are rock bolts known to include a rod threaded at each end, there being an anchor threaded onto one end, the anchor being for embedding in a ground formation. The anchor includes a cone threaded onto the rod, a "C"-shaped shell surrounding the cone and an axial abutment, often provided by a thrust ring, for the shell. Such a rock bolt is described in U.S. Pat. No. 3,837,258, issued Sep. 24, 1974 to Williams, the specification of which is incorporated herein by reference. Williams Form Engineering Corp. currently markets an anchor assembly having a smooth shell design under the trademark "SPIN-LOCK" and claims the anchor has been field proven to far exceed in tension capacity any other mechanical anchor on the market.

In practice, an anchor is typically installed by first drilling a hole into a ground formation. The anchoring end of the bolt is inserted into the hole with the proximal end of the rod projecting out of the hole. The arrangement of the anchor is such that relative rotation of the rod and cone in the appropriate direction results in movement of the cone along the rod to press the shell axially against the abutment and continued movement of the cone toward the abutment and against the shell causes the shell to expand. Ultimately the shell becomes jammed against the side of the hole so as to set the anchor in the hole. An apertured face plate is located against the ground facing around the hole with the proximal end of the rod projecting therethrough and a nut is threaded along the rod against the face plate to stress the rod as desired.

It is often desirable to infuse grout into the hole once a rock bolt has been installed. To this end, rods of some rock bolts in common use today are hollow. In installations, such as underground mines, where the hole is oriented upwardly into the roof of the mine, grout is generally pumped through an opening in the face plate to fill the hole and surround the bolt rod. Eventually the grout reaches the top of the rod and travels back down the center hole of the rod to emerge from the rod and give an indication of the completion of the grouting operation. In installations where a hole is oriented downwardly, the grout is generally injected through the rod and eventually emerges around the face plate to give an indication of the completion of the grouting operation.

A weak link in such a bolting arrangement often turns out to be the anchoring portion of the installation. It has been found that, over time, with stresses placed on the installation by ground movement, etc., the anchor portion does not sustain the tensile or pull-out forces placed on it and slippage occurs between the anchor shell and wall of the hole against which the shell is jammed.

This problem has not gone unrecognized, but an entirely satisfactory solution has apparently not been found. For example, the Williams patent specification, mentioned above, discloses cylindrical anchor shells having a circular outer cross section, that is, a relatively smooth rock contact area. The specification also describes a modified anchor shell having an arcuate depression (preferably annular) and a modified anchor shell having notch-shaped irregularities (preferably annular). These modified forms of anchor shell are described as facilitating the development of frictional and pressure-centered retaining forces.

The precise causes of difficulties that arise in the use of various rock bolt shells are not entirely understood, but current field practice is to choose a particular type of shell according to the type of rock formation in which the bolt is to be installed. Smooth shells are generally used in preference to ridged shells in conjunction with soft rock formations. The compressive strength of rock is generally about one third to one half greater than the shear strength of rock. A smooth-walled shell in which large surface area contact between the shell and rock is provided transfers a greater proportion of load to surrounding rock through compression than a ridged shell. Because of reduced shearing forces, a smooth-walled shell is thus expected to result in reduced localized crushing of soft rock relative to a ridged shell.

On the other hand, the problem of localized crushing of rock by shear forces is expected to be reduced when a bolt is anchored in relatively hard rock. In the case of a ridged shell, in which point contact between the shell and surrounding rock increases shear load transfer forces:, an enhanced resistance to slippage is thus expected.

There are also, at times, difficulties in setting a rock bolt in its hole. This may be due in part to a spinning of the entire bolt within its hole during the setting operation described above.

In any event, it would be advantageous to have a single rock bolt shell which could be used in a wider variety of rock formations than any shell currently available. At the very least, a rock bolt having enhanced performance characteristics in a particular context, stemming from either or both enhanced setting or anchoring characteristics, would be considered an improvement.

SUMMARY OF THE INVENTION

The present invention provides an expansible shell for use with, that is, for use as part of a rock bolt of the type having a cone threadedly engaged to a bolt rod. The shell is tubular shaped and, being expansible has an axial slit. The shell has an outer curved face lying on a surface of a circular cylinder. There is a raised ridge located along a curve of the cylinder, the curve being non-congruent with a circumferential circle of the cylinder.

The present invention includes, in a separate aspect, a cone for use as part of a rock bolt. The cone is threaded for installation on a threaded end of a rock bolt rod and includes a key for receipt within an axial slit of a surrounding expansible shell. The cone has one or more axial indentations to improve the flow of grout about the internal end of a ground-installed rock bolt. Preferably, the cone includes more than one indentation: one one either side of the key and/or one located diametrically opposite the key.

In a preferred aspect, the raised ridge of the shell is radially outwardly directed so as to have a first surface facing a first rotational direction, clockwise or counterclockwise, as the case may be.

There can be a pair of ridges in which the curve of one ridge is angled with respect to a central axis of the shell in one rotational direction while the curve of the other ridge is angled in the other rotational direction with respect to the central axis of the shell. The first surface of such paired ridges usually face opposite rotational directions.

The first surface can form a relatively steep angle with the surface of the cylinder, most preferably about ninety degrees. Further, the preferred embodiment shell, discussed in greater detail below, has a groove adjacent the first surface of each ridge and there is second ridge surface facing oppositely to the first surface, in the rotational sense, which forms a relatively small angle with the surface of the cylinder.

Preferably, the shell includes a pair of axially space apart longitudinal slots located opposite the axial slit of the shell.

A ridge can extend from an axial outer end of a slot toward a longitudinal edge of the slit in the shell. A ridge can extend from an axially inner end of a slot to axial edge, that is, end of the shell.

In the preferred embodiment, each ridge runs along a helical curve, or more simply, a helix of the cylindrical shell surface.. Preferably, such a helix makes an angle of about forty-five degrees with a center line of the tubular shell, but the angle could be more or less than this.

The relatively steep ridge surface is preferably at about ninety degrees with the cylindrical surface, but could be less than this value, while the shallow surface makes an interior angle of about thirty-two degrees, but this could vary, preferably remaining between about twenty and forty degrees.

Some of the ridges of the preferred embodiment are tapered. Such ridges taper gently radially inwardly from a high, that is radially extending maximum point.

In the preferred embodiment, most of the ridges are in pairs, each pair being in the shape of a "V". The high point of each tapered ridge is at the vertex of the "V" where the legs of the "V" meet. The relatively steep surface of each ridge is located along the outer edge of the "V" leg. Each such "V"-shaped projection is paired with another "V"-shaped projection such that outer surfaces of the legs of one projection face an opposite rotational direction to that of the legs of the other projection. Preferably, such pairs of "V"-shaped projections are arranged such that together they are in the shape of an "X".

BRIEF DESCRIPTION OF THE DRAWINGS

The above as well as other features and advantages the present invention are described in detail below in connection with a preferred embodiment, in which.

DETAILED DESCRIPTION OF A PREFERRED EMBODIMENT

Figure 1:
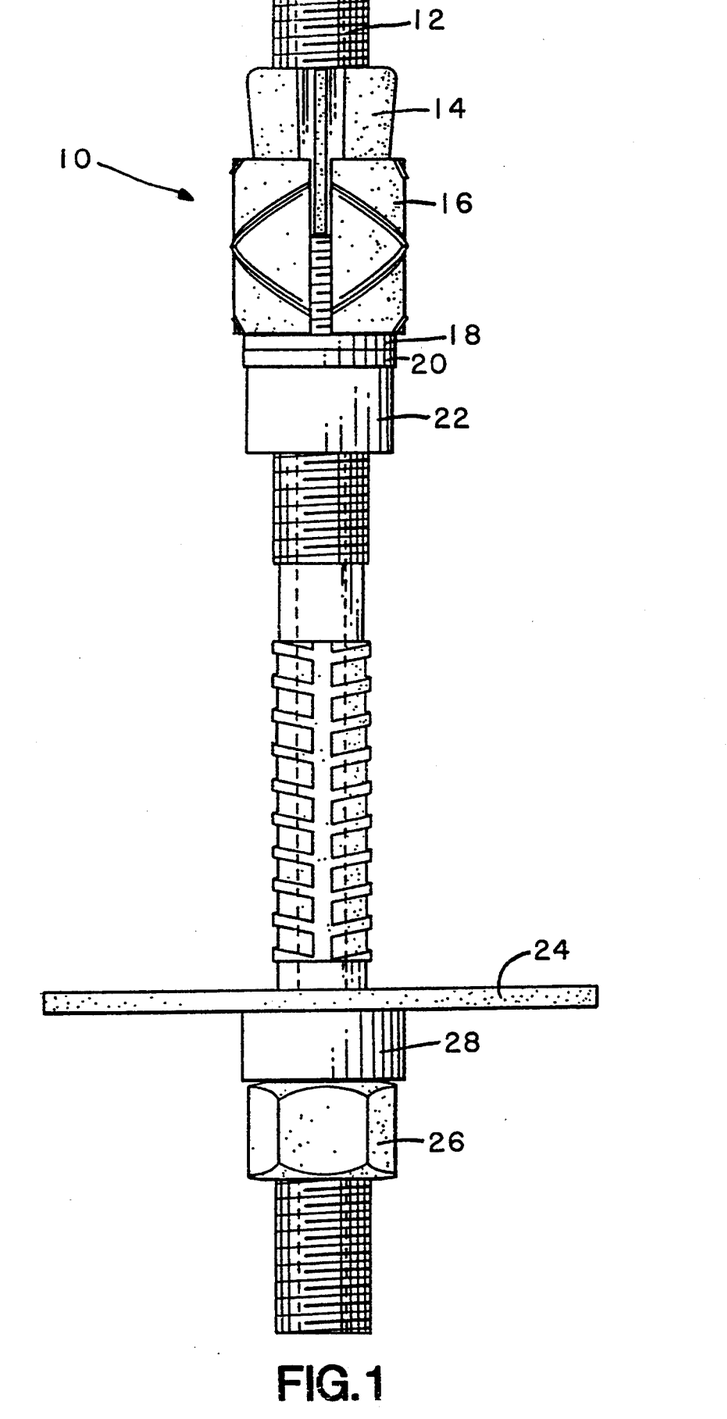
FIG. 1 is a side elevation of a rock bolt including a shell and cone of the present invention.

Turning to the drawings, rock bolt 10 including hollow rod 12 is shown in FIG. 1. Threaded onto the top threaded end of the rod (as oriented in FIG. 1) is cone 14 axially received within shell 16 which abuts against slip rings 18, 20, the lower of which rings in turn abuts against thrust ring 22 which is also threaded onto the rod. The lower threaded end of rod 12 includes face plate 24 for abutment against, for example, the facing of a mine roof against which it is tightened by nut 26 and intervening washer 28.

Figure 2:
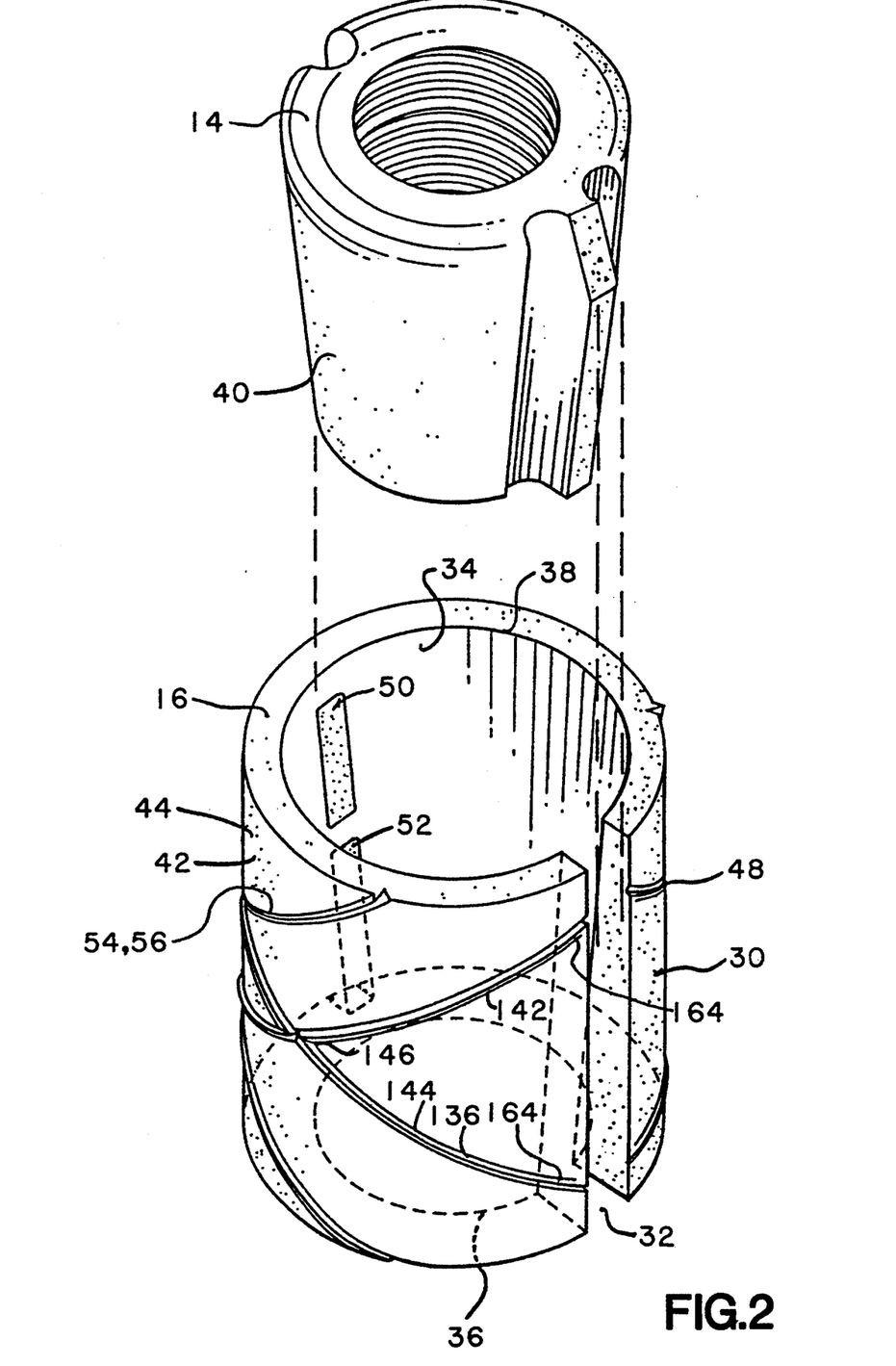
FIG. 2 is an exploded isometric view of a cone and shell of the present invention.

Shell 16 of the present invention is a tube 30 having a generally "C"-shaped cross section, easily seen in FIG. 2. The shell has an axial slit 32 extending from one axial end to the other. Inner face 34 of the tube is tapered, the tubular opening being narrower at its lower end 36 than at its top end 38. The inner portion 34 of the tube is thus frusto-conically shaped to match the shape of the outer face 40 of cone 14 for axial receipt of the cone thereagainst.

Outer face 42 of shell 16 lies on a surface of a circular cylinder 44. The outer cross section of the shell, taken perpendicularly to the longitudinal axis or center line 46 of the tube, is generally circular. The shell includes raised ridges 48, each of which ridges extends along a curve which is non-congruent with a circle of the cylinder centered on the central axis. In the case of the disclosed embodiment, each ridge is located along a helix of the cylinder. The shell includes a pair of axially spaced apart slots 50, 52 located diametrically opposite slit 32. The slots are each parallel to the slit.

Ridge 54 is located along helix 56 which winds around the cylinder. Helix 56 extends downardly in a clockwise rotational direction as viewed from above in the figures. Ridge 58 extends along helix 60. Helix 60 extends downwardly in a counterclockwise rotational direction as viewed from above in the figures. Helices 56, 60 are thus oriented in opposite rotational directions with respect to the central axis of the shell tube. Helix 56 makes the angle $\beta$ with the central axis of the tube which is of the same magnitude as angle $\beta'$ that helix 60 makes with the central axis. Since the two helixes are oriented in opposite rotational directions but form angles of the same magnitude with the central axis of the shell, the helixes are symmetrically oriented about the central axis.

Ridges 54, 58 each extends from the upper axial end or edge 62 of the shell to the axially inner end 64 of slot 50. Similarly, each of ridges 66, 68 extends from the lower axial edge 70 of the shell to axially inner end 72 of slot 52. Ridges 76, 78 extend from an axially outer end 80 of slot 50 to intersect with ridges 58, 54, respectively. Ridges 86, 88 extend from axially outer end 90 of slot 52 to intersect with ridges 66, 68, respectively. Ridges 92, 94 helically extend from slit edges 96, 98, respectively to intersect ridges 100, 102, respectively. Ridges 54, 86 are located along spaced apart helices which are parallel to each other. As well, ridges 58, 88 are located along helices which are spaced from and parallel to each other. Ridges 66, 100 extend along helices that are spaced apart and mutually parallel, as do ridges 68, 102. Ridges 54, 92 are located along helices that are spaced apart and parallel to each other as are ridges 58, 94. Ridges 68, 76 lie along mutually parallel spaced apart helices as do ridges 66, 78.

Figure 7:
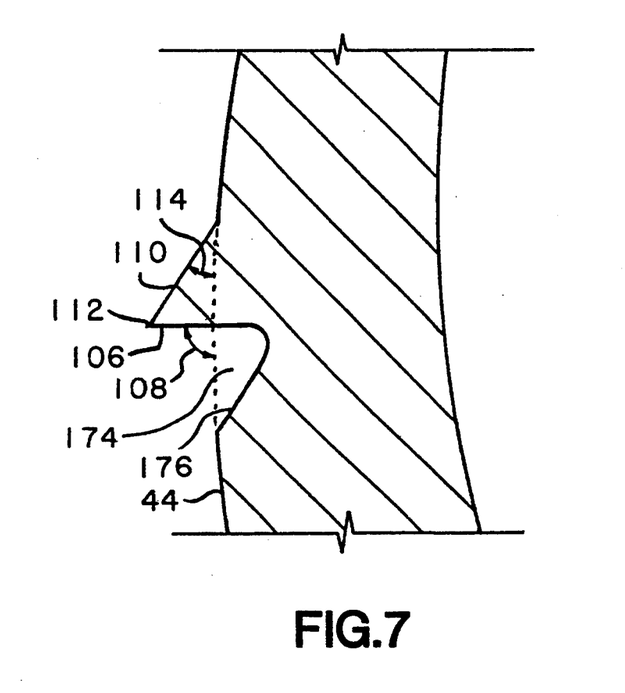
FIG. 7 is a sectional view of the shell taken along 7—7 of FIG. 6C.

The ridges of the preferred embodiment have the cross section shown in FIG. 7. Each ridge has a surface 106 which forms a relatively steep angle 108 with the surface of cylinder 44. In the illustrated embodiment this angle is about 90°, but the angle could be between about 80° and about 100°. Each ridge also has surface 110 which is angled toward surface 106, the surfaces meeting at apex 112. Surface 110 forms a relatively shallow inner angle 114 with cylinder 44. In the illustrated embodiment angle 114 is about 32°, but the angle could be between about 20° and 40°.

Figure 6A:
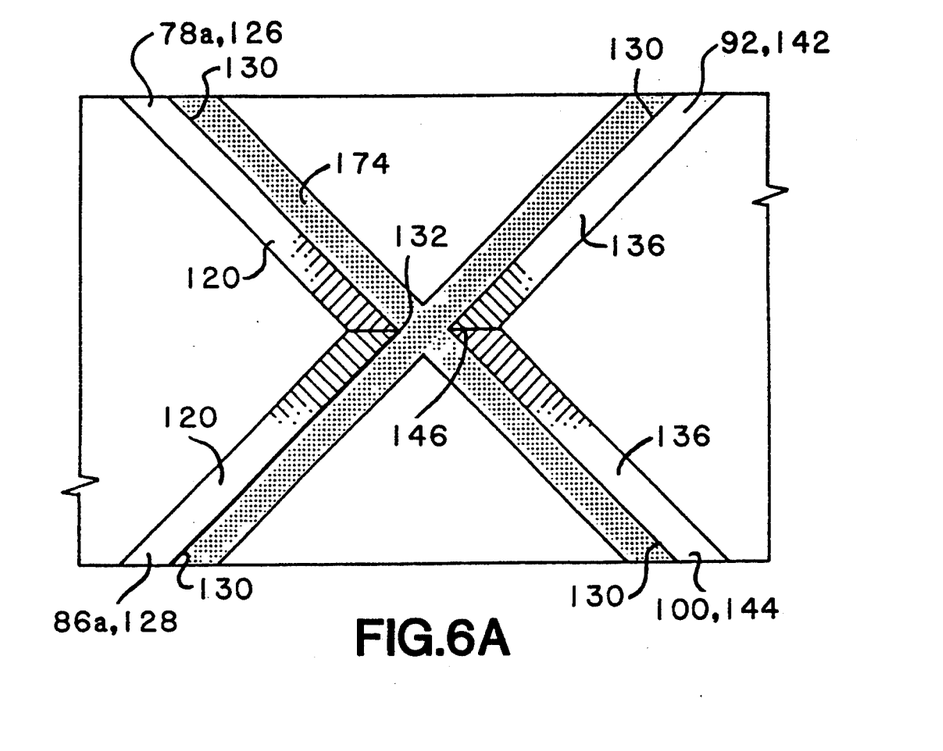
FIGS. 6A, 6B and 6C are side elevational details showing intersections of ridges and grooves of the FIG. 1 embodiment as seen from the right and center of FIG. 4; the upper or lower right-hand corner of FIG. 4 (these views being the same); and the upper or lower left-hand corner of FIG. 4 (these views being the same), respectively.

Ridges 76a, 88a, and 78a, 86a, are arranged as a pair of "V"-shaped projections 118, 120, respectively. Projection 118 thus has legs 122, 124 projecting radially outwardly of cylinder 44 and projection 120 has legs 126, 128 projecting radially outwardly of cylinder 44. Each leg of each "V"-shaped projection includes outer surface 130 at a relatively steep angle to the cylinder and these meet at the vertex 132 of the projection as can be seen in FIG. 6A for "V"-shaped projection 120. "V"-shaped projection 118 is oriented to have its outer surfaces facing a first rotational direction, that is, toward the left of FIG. 4. "V"-shaped projection 120 is oriented to have its outer surfaces facing the other rotational direction, that is, toward the right of FIGS. 4 and 6A. The vertices 132 of projections 118, 120 are located diametrically opposite to each other on tube 30. Each vertex is also located about midway between axial ends 62, 70 of the shell. The vertex of projection 118 is also located about midway between slots 50, 52 and slit edge 98. The vertex of projection 120 is located about midway between slots 50, 52 and slit edge 96.

There is a second pair of "V"-shaped projections 134, 136 which includes legs 138, 140 and 142, 144. Projections 134, 136 have their respective verticies 146 adjacent the verticies of "V"-shaped projections 118, 120. Outer surfaces 130 of projections having adjacent verticies face rotationally opposite directions. Therefore, surfaces 130 of projection 136 face toward the left as shown in FIG. 6A. Likewise, surfaces 130 of projection 134 face to the right in FIG. 3.

The shell includes a third pair of "V"-shaped projections 148, 150 having verticies located on the upper half of the shell while a fourth pair of "V"-shaped projections 152, 154 have verticies located on the lower half of the shell. Vertex 156 is located intermediate vertex 132 of projection 118, upper slot 50 and upper axial end 62. Vertex 158 is located intermediate vertex 132 of projection 120, upper slot 50 and upper axial end 62. Vertex 160 is located intermediate vertex 132 of projection 118, lower slot 52 and lower axial end 70. Vertex 162 is located between vertex 132 of projection 120, lower slot 52 and lower axial end 70 of the shell.

Certain of the ridges of the preferred embodiment are tapered radially inwardly. In the case of "V"-shaped projections 134, 136, 148, 150, 152, 154, the high point or apex of each ridge is located at the vertex of the projection. Thus, for example, "V"-shaped projection 136 shown in FIG. 2 tapers radially inwardly from its vertex 146 and the extent to which each of its legs 142, 144 radially extends beyond the surface of the cylinder diminishes as it approaches the edge of the axial slit. At the vertex, these legs extend about 0.05 inches beyond the surface of the cylinder. Each leg tapers so as to be essentially flush with the cylinder surface at its free end 164 at the edge of the axial slit. The shell is symmetrical about a center plane through the centers of axial slit 32 and slots 50, 52. "V"-shaped projection 134 thus has maximum radial extent at its vertex 146 in analogy to that described for projection 136.

"V"-shaped projections 148, 150, 152, 154 are dimensioned and shaped similarly to each other. Each has a maximum radial extent at its vertex and each leg tapers as it approaches its neighboring axial slot 50, 52, as the case may be.

Legs 122, 124 of "V"-shaped projection 118, and similarly legs 126, 128 of "V"-shaped projection 120 do not taper radially inwardly with respect to the cylindrical surface. Ridges 54a, 58a, 66a, 68a do not taper radially inwardly, but are of generally constant cross section.

Figure 3:
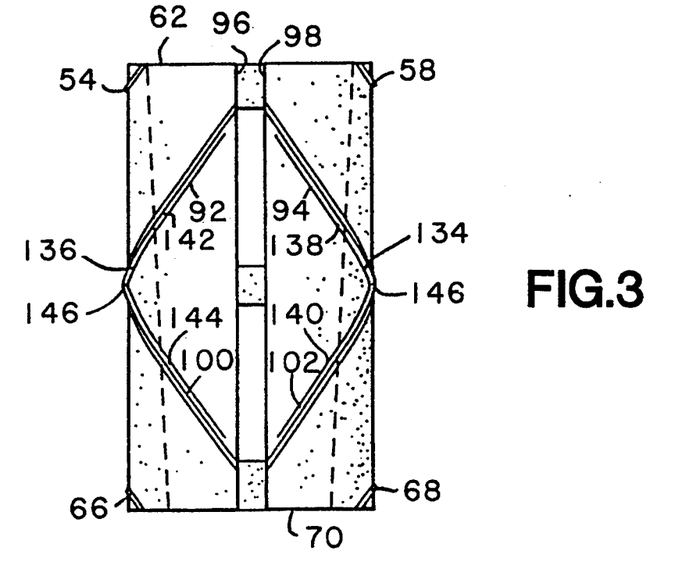
FIG. 3 is a side elevation of the shell as shown in FIG. 1.
Figure 4:
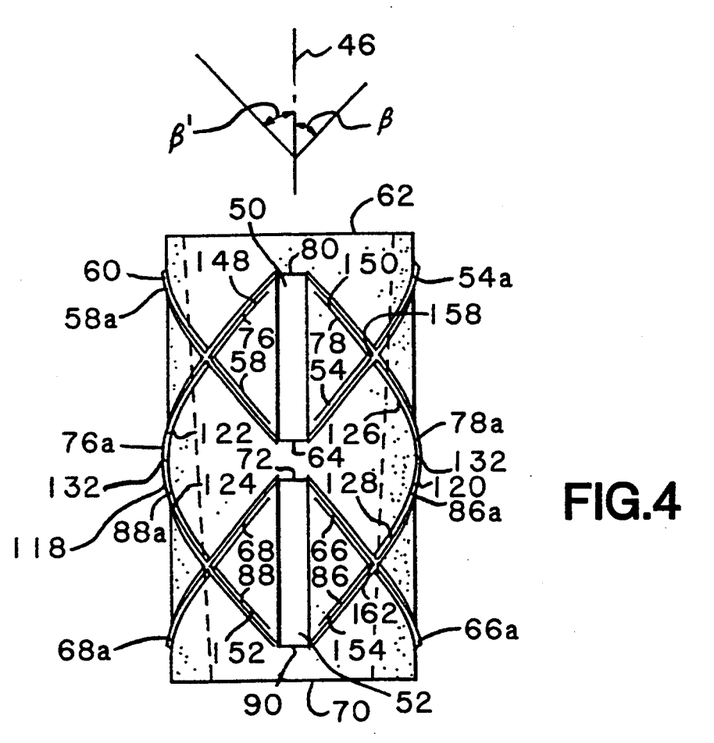
FIG. 4 is a side elevation of the shell of the present invention viewed from the rear as shown in FIG. 1.
Figure 5:
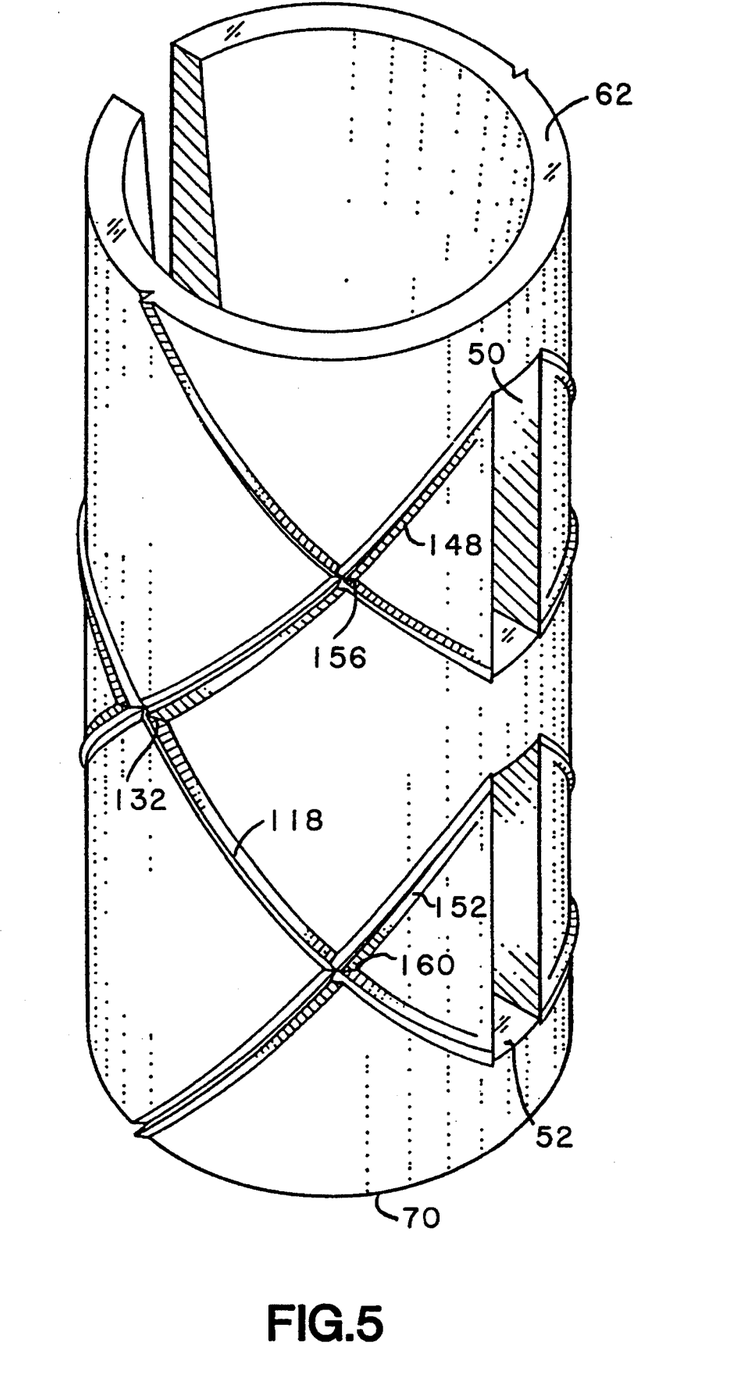
FIG. 5 is an isometric showing the top, rear and right-hand side of the shell as viewed in FIG. 1.

As seen in FIGS. 3 and 4 each helix of the illustrated embodiment forms an angle β or β' of about 45° with central axis 46, but these angles could be between about 55° and 65°.

The outer face of the shell includes groove 174 adjacent surface 106. In the illustrated embodiment each groove is coextensive with the ridge beside which it runs. Floor 176 of groove 174 is sloped similarly to surface 110. In the illustrated embodiment, the volume of the ridge that is radially outwardly of cylindrical surface 44 of the shell is at least substantially equal to the volume of the void created by the groove below the cylindrical surface of the shell.

Figure 6B:
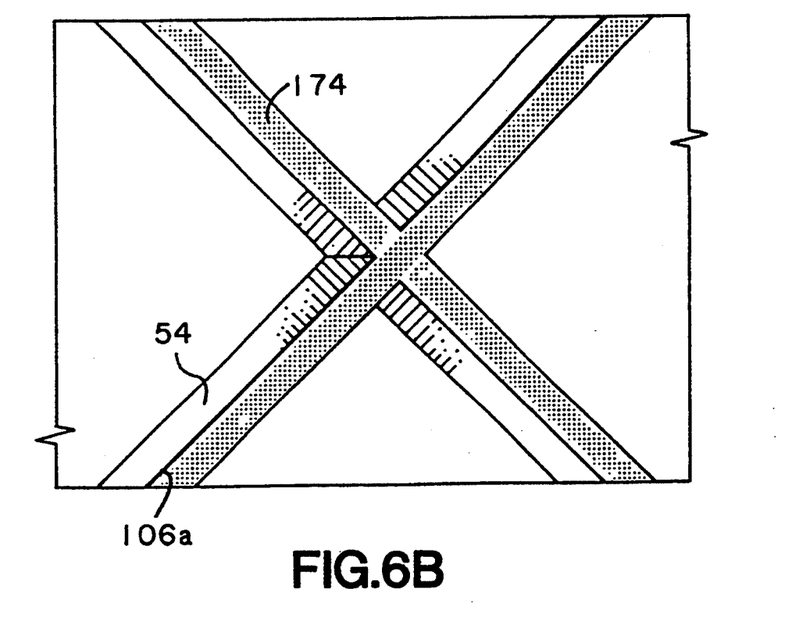
Figure 6C:
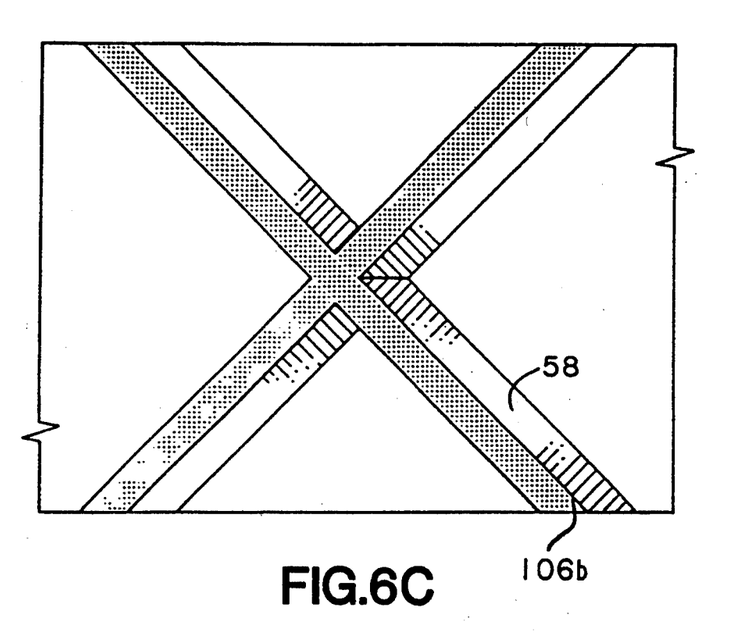

Paired ridges 54, 58 are located such that corresponding surfaces are oriented in rotationally opposite directions to each other. Surface 106a of ridge 54 is thus oriented so as to be facing to the right in FIG. 6B and surface 106b of ridge 58 is oriented so as to be facing to the left in FIG. 6C.

The disclosed embodiment shell would typically have the following dimensions: an outer cylindrical diameter of about 3.29 inches; a minimum inner diameter of about 1.71 inches; a maximum inner diameter of about 2.64 inches; a height of about 6 inches; slit and slot widths of about 0.425 inches; and a slot height of about 2.25 inches with an axial distance of about 0.5 inches between the slots. The shell end cone are of malleable cast iron according to ASTM 32510 specification.

Figure 8:
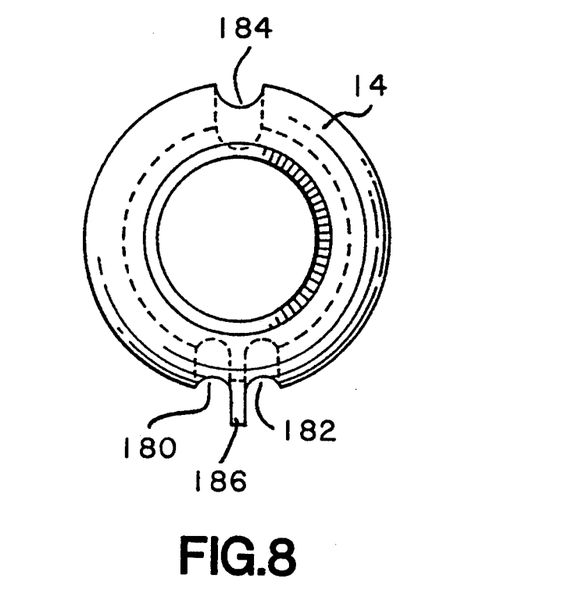
FIG. 8 is a top plan view of the cone of the present invention.
Figure 9:
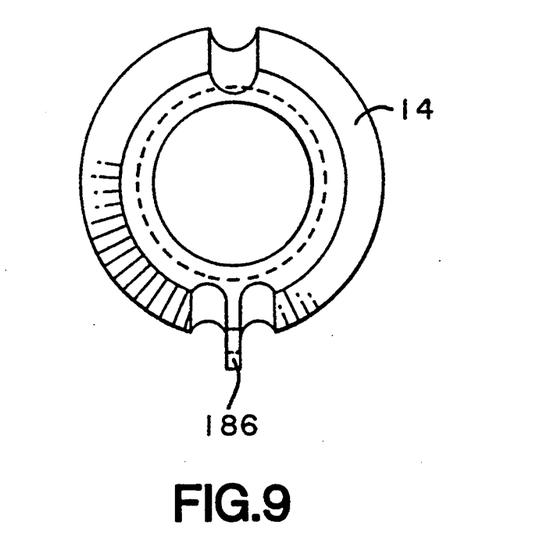
FIG. 9 is a bottom plan view of the cone of the present invention.

Cone 14 of the preferred embodiment, as best seen in FIGS. 2, 7 and 8 is shaped to have axial indentations 180, 182, 184, all of which indentations run the length of the cone. Arcuate channels forming outwardly concave grooves 180, 182 are located on either side of key 186 while channel 184 is located diametrically opposite the key. Key 186 is received within slit 32 of the shell in the assembled rock bolt, as most easily seen in FIGS. 1 and 2.

The disclosed embodiment cone for use with the disclosed shell would have the following dimensions: a maximum external diameter of about 3.29 inches; a minimum internal diameter of about 2.425 inches; the grooves adjacent the key would have a radius of about 0.1875 inches; the groove opposite the key would have a radius of about 0.25 inches; the key would extend about 0.26 inches beyond the maximum radius of the cone and have a width of about 0.15 inches.

It will be understood that dimensions of the disclosed embodiment have an error associated with them as with any product of cast iron.

In operation, for example in an underground mine, the distal end of a rock bolt having an anchor assembled onto it is inserted upwardly into a properly sized hole drilled into the mine roof. The proximal end of the rod is rotated and the shell of the anchor, being closely matched to the inner dimension of the hole, does not rotate and the cone threaded onto the rod is drawn downwardly, towards the proximal end of the rod. The movement of the cone against the shell, which abuts against the slip rings wedges against the shell to open the shell to produce a tighter fit of the shell against the wall of the drilled hole.

During installation rotation of the cone with respect to the shell is precluded by abutment of the key against a wall of the slit of the shell as the rod is rotated. After a bolt has been anchored in its hole, face plate 24, washer 28 and nut 26 are installed and the bolt is prestressed by rotation of the nut. Grout is then infused into the hole in an effort to surround the bolt and anchor assembly by the grout. In the case of installations, such as in a mine roof, in which a bolt is oriented with the anchor at the top end of a hole, the grout is usually introduced into the hole through an opening through the face plate. The grout is pumped up to the top of the bolt and passes back down through the center opening of the rod. In installations in which the hole is oriented downwardly so that the anchor is at the bottom of a hole, such as a hole in a floor, the grout is usually introduced through the central bore of the rod to eventually fill the hole and emerge through any cracks or openings between the face plate and floor facing.

Flow of the grout should be enhanced by channels 180, 182, 184 during a grouting step and in this way a more satisfactory installation achieved.

The present invention attempts to provide a shell having improved setting characteristics. To this end, provision of one or more ridges located along a curve or curves non-congruent with a circumferential circle of the cylinder of the shell, by inhibiting shell spin during a setting operation, may reduce the time required to install a rock bolt.

It is also thought that performance of a rock bolt assembly may be enhanced through the shell of the disclosed embodiment. Limited rotation of the shell within the hole during installation can result in ridges, especially those ridges having a steep surface oriented so as to be a leading surface during rotation, cutting into the wall of the hole. This should lead to enhanced resistance of the anchor shell to pull-out forces. If the rock is particularly hard, the remaining ridges, that is those in which the surfaces having a shallow angle facing the direction of rotation, might be bent, folded or otherwise deformed so as to be accepted into the groove, in part or in whole, adjacent the ridges. This would lead to an increased effective surface area for contact of the wall of the hole in the vicinity of these latter ridges. It will further be noted that the proportion of the external area of the shell taken up by the ridges and grooves is small compared to the outer shell area which lies on the cylindrical surface. In this way, the proportion of external shell surface area in direct abutment with rock would generally be substantial.

Orientation of the ridges, as illustrated, with the steep surface to be the leading ridge surface during pullout, that is, to face axially in the same direction as the direction of pullout may further enhance the anchoring capability of the shell. This should be operative both during tensioning of the rock bolt and later, after the grouting operation has been performed. A ridge helix angle of 45° with the central axis of the shell would seem to be optimum, but another angle may be found to be more suitable.

It is also thought that the relative lengths of the cone and shell may be of importance. In particular, the cone length should at least match that of the shell to allow for increased load-transfer in compression between the shell and rock interface while providing a ridge-groove detail to provide an equally distributed stress raiser to resist slippage in both the counter rotational and axial directions.

It may further be desirable for the tubular wall of the shell to be of decreased thickness in the area of the axial slots, to increase expansion of the shell during its installation.

The disclosed embodiment represents the best mode of the present invention as of the filing date of this specification. There are possible variations on the disclosed embodiment, as would be understood by a person skilled in the art, which would fall within the scope and spirit of the present invention as defined by the following claims.

What is claimed is:

1. A shell for a rock bolt with a cone threadedly engaged thereto, the shell comprising:

a tubular shaped member of malleable cast iron having a central axis therethrough and a single axial slit running from end-to-end of the member, an inner face of the member being shaped to axially receive the cone thereagainst and an outer curved face of the member lying on a surface of a circular cylinder; and a first raised ridge located along a curve of the cylinder, the curve being non-congruent with a circumferential circle of the cylinder, wherein said ridge has a radially outwardly directed first surface facing a first rotational direction and a radially outwardly directed second surface facing a second rotational direction wherein said first surface forms a relatively large angle with the cylinder and said second surface forms a relatively small angle with the cylinder, and wherein said tubular member has a groove located adjacent the first surface of said ridge.

2. The shell of claim 1 wherein the ridge is tapered axially inwardly along its length.

3. The shell of claim 1 wherein there is a first pair of said ridges, the curve of the first of the pair being angled with respect to the axis in a rotationally first direction, the curve of the second of the pair being angled with respect to the axis in a rotationally second direction and the first surface of each of the ridges being oriented to face a rotationally opposite direction to that of the other.

4. The shell of claim 3, further comprising a second pair of said ridges wherein the first and second ridges of each of the pairs of ridges are symmetrically oriented about a center plane of the tubular member.

5. The shell of claim 3 wherein the tubular shaped member has a pair of spaced apart slots located diametrically opposite the slit and parallel thereto.

6. The shell of claim 5 wherein each of the ridges extends from an axially outer end of a first of the slots toward an edge of the slit.

7. The shell of claim 6, further comprising a second pair of said ridges wherein each ridge of the second pair extends from an axially outer end of a second of the slots to an edge of the slit.

8. The shell of claim 7, further comprising a third pair of said ridges wherein each ridge of the third pair extends from an axially inner end of the first of the slots to a first axial edge of tile shell.

9. The shell of claim 8, further comprising a fourth pair of said ridges wherein each ridge of the fourth pair extends from an axially inner end of the second of the slots to a second axial edge of the shell.

10. The shell of claim 9 wherein the tubular member has a groove located adjacent the first surface of each ridge.

11. The shell of claim 9 wherein the first and second ridges of the first and third pairs of ridges, respectively, are parallel to each other, and the first and second ridges of the second and fourth pairs of ridges, respectively, are parallel to each other.

12. The shell of claim 11 wherein each said curve is a helix.

13. A shell for a rock bolt with a cone threadedly engaged thereto, the shell comprising:
 a tube of malleable cast iron having an axial slit running from end-to-end of the tube, an inner face of the tube being conically shaped to axially receive the cone thereagainst and the tube having a curved outer face lying on a surface of a circular cylinder; and
 a first raised ridge located along a helix of the cylinder, the ridge having a first surface forming a relatively steep angle with the surface of the cylinder and a second surface angeled toward the first surface and forming a relatively shallow angle with the surface of the cylinder; and
 a second raised ridge located along a helix of the cylinder, the ridge having a first surface forming a relatively steep angle with the surface of the cylinder and a second surface angled toward the first surface and forming a relatively shallow angle with the surface of the cylinder, said first and second ridges forming a first pair of said ridges, wherein
 the helix of the first ridge of the pair is oriented in a first rotational direction with respect to a central axis of the cylinder and the helix of the second ridge of the pair is oriented in a second rotational direction with respect to the central axis of the cylinder, and the first surface of each of the ridges is oriented to face a rotationally opposite direction to that of the other; and
 wherein the outer face of said tube includes first and second grooves located adjacent to the first surface of each of said ridges wherein each of said grooves is angled radially inwardly toward the first surface of the ridge to which it adjacent and wherein each of said grooves is sufficiently large to to accept a volume at least as great as that of the ridge to which it is adjacent.

14. The shell of claim 13 wherein there is a second said pair of ridges the first of each pair spaced from each other and the second of each pair spaced from each other.

15. The shell of claim 13 wherein the tube has a slot located diametrically opposite the slit and parallel thereto.

16. The shell of claim 14 wherein the tube has a pair of spaced apart slots located diametrically opposite the slit and parallel thereto, each ridge of the first pair of of ridges extends from an axially outer end of a first of the slots to an edge of the slit and each ridge of the second pair of ridges extends from an axially outer end of a second of the slots to an edge of the slit.

17. The shell of claim 13 wherein the relatively steep angle is between about eighty degrees and about one hundred degrees.

18. The shell of claim 13 wherein the relatively steep angle is about ninety degrees.

19. The shell of claim 13 where the relatively shallow angle is between about twenty degrees and about forty degrees.

20. The shell of claim 13 wherein the relatively shallow angle is about thirty-two degrees.

21. The shell of claim 13 wherein each helix and the axis form an angle of from between about thirty-five degrees and about fifty-five degrees.

22. The shell of claim 13 wherein each helix and the axis form an angle of about forty-five degrees.

23. The shell of claim 13 wherein the ridge is tapered axially inwardly along its length.

24. The shell of claim 16 wherein there is a third said pair of ridges, wherein each ridge of the third pair of ridges extends from an axially inner end of the first of the slots to a first axial end of the shell.

25. The shell of claim 24 wherein there is fourth said pair of ridges, wherein each ridge of the fourth pair of ridges extends from an axially inner end of the second of the slots to a second axial end of the shell.

26. The shell of claim 25 wherein the outer surface includes a groove located adjacent the first surface of each ridge of at least one said pair of ridges.

27. The shell of claim 25 wherein the groove is angled radially inwardly and toward the first surface of the ridge.

28. The shell of claim 27 wherein a said groove is located adjacent the first surface of each ridge.

29. A rock bolt comprising:
 a rod threaded at one end;
 abutment means axially spaced from a tip of the threaded end;
 a shell having an axial slit therein, for axial receipt on the threaded end for abutting contact with the abutment means; and
 a cone for threaded installation onto the threaded end, the cone having a key for receipt within the axial slit of the shell when the cone is installed, to preclude relative rotation of the shell and the cone; and wherein,
 the shell comprises:
  a tubular shaped member of malleable cast iron having a central axis therethrough and an axial slit running from end-to-end of the member, an inner face of the member being shaped to axially receive the cone thereagainst and an outer curved face of the member lying on a circular cylinder; and a first raised ridge located along a curve of the cylinder, the curve being non-congruent with a circumferential circle of the cylinder, wherein said ridge has a radially outwardly directed first surface facing a first rotational direction and a radially outwardly directed second surface facing a second rotational direction wherein said first surface forms a relatively large angle with the cylinder and said second surface forms a relatively small angle with the cylinder, and wherein said tubular member has a groove located adjacent the first surface of said ridge.

30. The rock bolt of claim 29 wherein
the cone has at least one axial indentation for flow of grout therethrough.

31. A shell for a rock bolt with a cone threadedly engaged thereto, the shell comprising:
a tubular shaped member having a central axis therethrough and an axial slit therein, an inner face of the member being shaped to axially receive the cone thereagainst and an outer curved face of the member lying on a Surface of a circular cylinder; and a first pair of "V"-shaped projections, each projection having first and second legs projecting radially outwardly of the surface, each leg having an outer surface at a relatively steep angle to the cylinder and the outer surfaces meeting at a vertex of the "V"-shaped projection; and wherein:

a first of the pair of projections is oriented to have its outer surfaces facing a first rotational direction and a second of the pair of projections is oriented to have its outer surfaces facing a second rotational direction.

32. The shell of claim 31 wherein the vertices of the first and second projections are at diametrically opposite locations with respect to each other.

33. The shell of claim 32 wherein each of the projections is spaced about midway between axial ends of the tubular member.

34. The shell of claim 32 wherein there is a second said pair of said projections.

35. The shell of claim 34 wherein the verticies of the first projections of the first and second pairs are adjacent to each other and the outer surfaces of the first projections of the first and second pairs face rotationally opposite directions to each other and the verticies of the second projections of the first and second pairs are adjacent to each other and the outer surfaces of the second projections of the first and second pairs face rotationally opposite directions to each other.

36. The shell of claim 35, further comprising third and fourth pairs of said projections, the third pair being located to have vertices intermediate the vertices of the first and second pairs and a first axial end of the member and the fourth pair being located to have vertices intermediate the vertices of the first and second pairs and a second axial end of the member.

37. The shell of claim 36 wherein the tubular member has a groove adjacent each outer surface of each projection.

38. The shell of claim 31 wherein each of the legs of each projection is tapered radially inwwardly from the vertex to an opposite end of the leg.

39. The shell of claim 31 wherein each leg extends along a helix of the cylinder.

40. The shell of claim 32 wherein the tubular member has a pair of axially aligned spaced apart slots located diametrically opposite the slit and parallel thereto.

41. The shell of claim 40 wherein the first projection is located intermediate the slots and a first edge of the slit and the legs of the first projection extend toward the first edge of the slit and the second projection is located intermediate the slots and a second edge of the slit and the legs of the second projection extend toward the second edge of the slit.

42. The shell of claim 41 wherein there is a second pair of said projections, and the verticies of the first projections of the first and second pairs are adjacent to each other and the legs of the first projection of the second pair extend toward the slots and and verticies of the second projections of the first and second pairs are adjacent to each other and the legs of the second projection of the second pair extend toward the slots.

43. The shell of claim 40 wherein the first projection is located intermediate the slots and a first edge of the slit and the legs of the first projection extend toward the slots and the second projection is located intermediate the slots and a second edge of the slit and the legs of the second projection extend toward the slots.

44. The shell of claim 42, further comprising third and fourth pairs of said projections, the first projection of the third pair being located intermediate the first projection of the second pair, the slots and a first axial end of the member, the second projection of the third pair being located intermediate the second projection of the second pair, the slots and the first axial end of the member, the first projection of the fourth pair being located intermediate the first projection of the second pair, the slots and a second axial end of the member and the second projection of the fourth pair being located intermediate the second projection of the second pair, the slots and the second axial end of the member.

45. The shell of claim 44 wherein the legs of the projections of the third and fourth pairs extend toward the slots.

46. The shell of claim 45 wherein each leg has an inner surface angled toward the outer surface of the leg and at a relatively shallow angle to the cylinder.

47. A shell for a rock bolt with a cone threadedly engaged thereto, the shell comprising:
a tubular shaped member of malleable cast iron having a central axis therethrough and a single axial slit running from end-to-end of the member, an inner face of the member being shaped to axially receive the cone thereagainst and an outer curved face of the member lying on a surface of a circular cylinder; and a first raised ridge located along a curve of the cylinder, the curve being non-congruent with a circumferential circle of the cylinder, wherein said ridge has a radially outwardly directed first surface facing a first rotational direction and a radially outwardly directed second surface facing a second rotational direction, and wherein said tubular member has a groove located adjacent the first surface of said ridge.

* * * * *